(12) United States Patent  
Nagasamy

(10) Patent No.: US 10,829,046 B2
(45) Date of Patent: Nov. 10, 2020

(54) TRAILER ANGLE DETECTION USING END-TO-END LEARNING

(71) Applicant: Ford Global Technologies, LLC, Dearborn, MI (US)

(72) Inventor: Vijay Nagasamy, Fremont, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 80 days.

(21) Appl. No.: 16/294,540

(22) Filed: Mar. 6, 2019

(65) Prior Publication Data

US 2020/0282910 A1 Sep. 10, 2020

(51) Int. Cl.
*B60R 1/00* (2006.01)
*B60D 1/36* (2006.01)
(Continued)

(52) U.S. Cl.
CPC ............... *B60R 1/003* (2013.01); *B60D 1/36* (2013.01); *G06N 3/08* (2013.01); *G06N 20/00* (2019.01);
(Continued)

(58) Field of Classification Search
CPC .......... B60R 1/003; G06N 20/00; G06N 3/08; B60D 1/36
See application file for complete search history.

(56) References Cited

U.S. PATENT DOCUMENTS 3,542,390 A 11/1970 Fikes et al.
3,605,088 A 9/1971 Savelli
(Continued)

FOREIGN PATENT DOCUMENTS

CN 102582686 B 9/2013
CN 106250893 A 12/2016
(Continued)

OTHER PUBLICATIONS

SH. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.
(Continued)

*Primary Examiner* — Ruiping Li
(74) *Attorney, Agent, or Firm* — David Coppiellie; Price Heneveld LLP

(57) ABSTRACT

A method for training an image-based trailer identification system comprises capturing a plurality of captured images in a field of view and identifying a detected trailer angle for a trailer in connection with a vehicle in each of the captured images. The method further comprises comparing the captured images and the corresponding trailer angles to a predetermined image set comprising a plurality of teaching trailer angles and identifying at least one required trailer angle of the teaching trailer angles that is not included in the captured images. Based on the captured images, a simulated angle image is generated. The simulated image comprises a depiction of the trailer in connection with the vehicle at the at least one required angle not included in the captured images. The method further comprises supplying the simulated angle image to the identification system for training.

20 Claims, 7 Drawing Sheets

(51) Int. Cl.
*G06N 3/08* (2006.01)
*G06N 20/00* (2019.01)

(52) U.S. Cl.
CPC ..... *B60R 2300/105* (2013.01); *B60R 2300/60* (2013.01); *B60R 2300/808* (2013.01)

(56) References Cited

U.S. PATENT DOCUMENTS

| | | |
|---|---|---|
| 3,787,077 A | 1/1974 | Sanders |
| 3,833,928 A | 9/1974 | Gavit et al. |
| 3,860,257 A | 1/1975 | Mesly |
| 4,040,006 A | 8/1977 | Kimmel |
| 4,042,132 A | 8/1977 | Bohman et al. |
| 4,122,390 A | 10/1978 | Kollitz et al. |
| 4,212,483 A | 7/1980 | Howard |
| 4,366,966 A | 1/1983 | Ratsko et al. |
| 4,735,432 A | 4/1988 | Brown |
| 4,752,080 A | 6/1988 | Rogers |
| 4,848,449 A | 7/1989 | Martinet et al. |
| 4,852,901 A | 8/1989 | Beasley et al. |
| 4,943,080 A | 7/1990 | Reimer |
| 5,001,639 A | 3/1991 | Breen |
| 5,056,905 A | 10/1991 | Jensen |
| 5,097,250 A | 3/1992 | Hernandez |
| 5,108,123 A | 4/1992 | Rubenzik |
| 5,108,158 A | 4/1992 | Breen |
| 5,132,851 A | 7/1992 | Bomar et al. |
| 5,152,544 A | 10/1992 | Dierker, Jr. et al. |
| 5,191,328 A | 3/1993 | Nelson |
| 5,244,226 A | 9/1993 | Bergh |
| 5,246,242 A | 9/1993 | Penzotti |
| 5,247,442 A | 9/1993 | Kendall |
| 5,282,641 A | 2/1994 | McLaughlin |
| 5,289,892 A | 3/1994 | Notsu |
| 5,290,057 A | 3/1994 | Pellerito |
| 5,455,557 A | 10/1995 | Noll et al. |
| 5,521,633 A | 5/1996 | Nakajima et al. |
| 5,523,947 A | 6/1996 | Breen |
| 5,541,778 A | 7/1996 | DeFlorio |
| 5,558,350 A | 9/1996 | Kimbrough et al. |
| 5,559,696 A | 9/1996 | Borenstein |
| 5,579,228 A | 11/1996 | Kimbrough et al. |
| 5,631,656 A | 5/1997 | Hartman et al. |
| 5,650,764 A | 7/1997 | McCullough |
| 5,690,347 A | 11/1997 | Juergens et al. |
| 5,719,713 A | 2/1998 | Brown |
| 5,747,683 A | 5/1998 | Gerum et al. |
| 5,821,852 A | 10/1998 | Fairchild |
| 5,980,048 A | 11/1999 | Rannells, Jr. et al. |
| 6,041,582 A | 3/2000 | Tiede et al. |
| 6,042,196 A | 3/2000 | Nakamura et al. |
| 6,124,709 A | 9/2000 | Allwine |
| 6,151,175 A | 11/2000 | Osha |
| 6,198,992 B1 | 3/2001 | Winslow |
| 6,217,177 B1 | 4/2001 | Rost |
| 6,218,828 B1 | 4/2001 | Bates et al. |
| 6,223,104 B1 | 4/2001 | Kamen et al. |
| 6,223,114 B1 | 4/2001 | Boros et al. |
| 6,268,800 B1 | 7/2001 | Howard |
| 6,292,094 B1 | 9/2001 | Deng et al. |
| 6,351,698 B1 | 2/2002 | Kubota et al. |
| 6,472,865 B1 | 10/2002 | Tola et al. |
| 6,480,104 B1 | 11/2002 | Wall et al. |
| 6,483,429 B1 | 11/2002 | Yasui et al. |
| 6,494,476 B2 | 12/2002 | Masters et al. |
| 6,498,977 B2 | 12/2002 | Wetzel et al. |
| 6,539,288 B2 | 3/2003 | Ishida et al. |
| 6,568,093 B2 | 5/2003 | Kogiso et al. |
| 6,577,952 B2 | 6/2003 | Geier et al. |
| 6,668,225 B2 | 12/2003 | Oh et al. |
| 6,704,653 B2 | 3/2004 | Kuriya et al. |
| 6,712,378 B1 | 3/2004 | Austin |
| 6,801,125 B1 | 10/2004 | McGregor et al. |
| 6,806,809 B2 | 10/2004 | Lee et al. |
| 6,820,888 B1 | 11/2004 | Griffin |
| 6,838,979 B2 | 1/2005 | Deng et al. |
| 6,854,557 B1 | 2/2005 | Deng et al. |
| 6,857,494 B2 | 2/2005 | Kobayashi et al. |
| 6,879,240 B2 | 4/2005 | Kruse |
| 6,956,468 B2 | 10/2005 | Lee et al. |
| 6,959,970 B2 | 11/2005 | Tseng |
| 6,999,856 B2 | 2/2006 | Lee et al. |
| 7,005,974 B2 | 2/2006 | McMahon et al. |
| 7,006,127 B2 | 2/2006 | Mizusawa et al. |
| 7,008,088 B2 | 3/2006 | Pisciotti |
| 7,028,804 B2 | 4/2006 | Eki et al. |
| 7,032,705 B2 | 4/2006 | Zheng et al. |
| 7,046,127 B2 | 5/2006 | Boddy |
| 7,058,493 B2 | 6/2006 | Inagaki |
| 7,089,101 B2 | 8/2006 | Fischer et al. |
| 7,154,385 B2 | 12/2006 | Lee et al. |
| 7,159,890 B2 | 1/2007 | Craig et al. |
| 7,167,785 B2 | 1/2007 | Lohberg et al. |
| 7,170,285 B2 | 1/2007 | Spratte |
| 7,171,330 B2 | 1/2007 | Kruse et al. |
| 7,204,504 B2 | 4/2007 | Gehring et al. |
| 7,219,913 B2 | 5/2007 | Atley |
| 7,225,891 B2 | 6/2007 | Gehring et al. |
| 7,229,139 B2 | 6/2007 | Lu et al. |
| 7,239,958 B2 | 7/2007 | Grougan et al. |
| 7,269,489 B2 | 9/2007 | Deng et al. |
| 7,272,481 B2 | 9/2007 | Einig et al. |
| 7,295,907 B2 | 11/2007 | Lu et al. |
| 7,401,871 B2 | 7/2008 | Lu et al. |
| 7,405,557 B2 | 7/2008 | Spratte et al. |
| 7,413,266 B2 | 8/2008 | Lenz et al. |
| 7,425,889 B2 | 9/2008 | Widmann et al. |
| 7,447,585 B2 | 11/2008 | Tandy, Jr. et al. |
| 7,451,020 B2 | 11/2008 | Goetting et al. |
| 7,463,137 B2 | 12/2008 | Wishart et al. |
| 7,504,995 B2 | 3/2009 | Lawrence et al. |
| 7,532,109 B2 | 5/2009 | Takahama et al. |
| 7,540,523 B2 | 6/2009 | Russell et al. |
| 7,548,155 B2 | 6/2009 | Schutt et al. |
| 7,568,716 B2 | 8/2009 | Dietz |
| 7,623,952 B2 | 11/2009 | Unruh et al. |
| 7,648,153 B2 | 1/2010 | Metternich et al. |
| 7,690,737 B2 | 4/2010 | Lu |
| 7,715,953 B2 | 5/2010 | Shepard |
| 7,731,302 B2 | 6/2010 | Tandy, Jr. et al. |
| 7,793,965 B2 | 9/2010 | Padula |
| 7,798,263 B2 | 9/2010 | Tandy, Jr. et al. |
| 7,878,545 B2 | 2/2011 | Rhymer et al. |
| 7,904,222 B2 | 3/2011 | Lee et al. |
| 7,905,507 B2 | 3/2011 | Perri |
| 7,950,751 B2 | 5/2011 | Offerle et al. |
| 7,953,536 B2 | 5/2011 | Katrak |
| 7,974,444 B2 | 7/2011 | Hongo |
| 8,010,252 B2 | 8/2011 | Getman et al. |
| 8,010,253 B2 | 8/2011 | Lundquist |
| 8,036,792 B2 | 10/2011 | Dechamp |
| 8,038,166 B1 | 10/2011 | Piesinger |
| 8,044,779 B2 | 10/2011 | Hahn et al. |
| 8,073,594 B2 | 12/2011 | Lee et al. |
| 8,157,284 B1 | 4/2012 | McGhie et al. |
| 8,165,770 B2 | 4/2012 | Getman et al. |
| 8,167,444 B2 | 5/2012 | Lee et al. |
| 8,170,726 B2 | 5/2012 | Chen et al. |
| 8,174,576 B2 | 5/2012 | Akatsuka et al. |
| 8,180,543 B2 | 5/2012 | Futamura et al. |
| 8,190,364 B2 | 5/2012 | Rekow |
| 8,191,915 B2 | 6/2012 | Freese, et al. |
| 8,192,036 B2 | 6/2012 | Lee et al. |
| 8,215,436 B2 | 7/2012 | DeGrave et al. |
| 8,223,204 B2 | 7/2012 | Hahn |
| 8,244,442 B2 | 8/2012 | Craig et al. |
| 8,260,518 B2 | 9/2012 | Englert |
| 8,267,485 B2 | 9/2012 | Barlsen et al. |
| 8,280,607 B2 | 10/2012 | Gatti et al. |
| 8,308,182 B2 | 11/2012 | Ortmann et al. |
| 8,326,504 B2 | 12/2012 | Wu et al. |
| 8,342,560 B2 | 1/2013 | Albers et al. |
| 8,380,390 B2 | 2/2013 | Sy et al. |
| 8,380,416 B2 | 2/2013 | Offerle et al. |

(56) References Cited

U.S. PATENT DOCUMENTS

| | | |
|---|---|---|
| 8,393,632 B2 | 3/2013 | Vortmeyer et al. |
| 8,401,744 B2 | 3/2013 | Chiocco |
| 8,427,288 B2 | 4/2013 | Schofield et al. |
| 8,469,125 B2 | 6/2013 | Yu et al. |
| 8,504,243 B2 | 8/2013 | Kageyama |
| 8,548,680 B2 | 10/2013 | Ryerson et al. |
| 8,548,683 B2 | 10/2013 | Cebon et al. |
| 8,576,115 B2 | 11/2013 | Basten |
| 8,626,382 B2 | 1/2014 | Obradovich |
| 8,675,953 B1 | 3/2014 | Elwell et al. |
| 8,755,984 B2 | 6/2014 | Rupp et al. |
| 8,807,261 B2 | 8/2014 | Subrt et al. |
| 8,825,328 B2 | 9/2014 | Rupp et al. |
| 8,833,789 B2 | 9/2014 | Anderson |
| 8,886,400 B2 | 11/2014 | Kossira et al. |
| 8,888,120 B2 | 11/2014 | Trevino |
| 8,909,426 B2 | 12/2014 | Rhode et al. |
| 8,930,140 B2 | 1/2015 | Trombley et al. |
| 8,939,462 B2 | 1/2015 | Adamczyk et al. |
| 8,955,865 B2 | 2/2015 | Fortin et al. |
| 8,972,109 B2 | 3/2015 | Lavoie et al. |
| 9,008,913 B1 | 4/2015 | Sears et al. |
| 9,026,311 B1 | 5/2015 | Pieronek et al. |
| 9,042,603 B2 | 5/2015 | Elwart et al. |
| 9,082,315 B2 | 7/2015 | Lin et al. |
| 9,108,598 B2 | 8/2015 | Headley |
| 9,114,832 B2 | 8/2015 | Wang et al. |
| 9,120,358 B2 | 9/2015 | Motts et al. |
| 9,120,359 B2 | 9/2015 | Chiu et al. |
| 9,156,496 B2 | 10/2015 | Greenwood et al. |
| 9,164,955 B2 | 10/2015 | Lavoie et al. |
| 9,180,890 B2 | 11/2015 | Lu et al. |
| 9,187,124 B2 | 11/2015 | Trombley et al. |
| 9,227,474 B2 | 1/2016 | Liu |
| 9,238,483 B2 | 1/2016 | Hafner et al. |
| 9,248,858 B2 | 2/2016 | Lavoie et al. |
| 9,296,422 B2 | 3/2016 | Lavoie |
| 9,315,212 B1 | 4/2016 | Kyrtsos et al. |
| 9,321,483 B2 | 4/2016 | Headley |
| 9,335,162 B2 | 5/2016 | Kyrtsos et al. |
| 9,340,228 B2 | 5/2016 | Xu et al. |
| 9,393,996 B2 | 7/2016 | Goswami et al. |
| 9,428,188 B2 | 8/2016 | Schwindt et al. |
| 9,434,414 B2 | 9/2016 | Lavoie |
| 9,437,055 B2 | 9/2016 | Kuehnle et al. |
| 9,500,497 B2 | 11/2016 | Lavoie |
| 9,610,974 B2 | 4/2017 | Herzog et al. |
| 9,616,923 B2 | 4/2017 | Lavoie |
| 9,623,904 B2 | 4/2017 | Lavoie et al. |
| 9,676,377 B2 | 6/2017 | Hafner et al. |
| 9,731,568 B2 | 8/2017 | Wuergler et al. |
| 9,798,953 B2 | 10/2017 | Hu |
| 9,802,542 B2 | 10/2017 | Lu et al. |
| 9,827,818 B2 | 11/2017 | Hu et al. |
| 9,836,060 B2 | 12/2017 | Ghneim et al. |
| 9,840,278 B2 | 12/2017 | Lavoie et al. |
| 10,046,800 B2 | 8/2018 | Hu et al. |
| 2001/0024333 A1 | 9/2001 | Rost |
| 2001/0037164 A1 | 11/2001 | Hecker |
| 2002/0128764 A1 | 9/2002 | Hecker et al. |
| 2004/0017285 A1 | 1/2004 | Zielinski et al. |
| 2004/0021291 A1 | 2/2004 | Haug et al. |
| 2004/0093139 A1 | 5/2004 | Wildey et al. |
| 2004/0130441 A1 | 7/2004 | Lee et al. |
| 2004/0222881 A1 | 11/2004 | Deng et al. |
| 2005/0000738 A1 | 1/2005 | Gehring et al. |
| 2005/0128059 A1 | 6/2005 | Vause |
| 2005/0206224 A1 | 9/2005 | Lu |
| 2005/0206225 A1 | 9/2005 | Offerle et al. |
| 2005/0206229 A1 | 9/2005 | Lu et al. |
| 2005/0206231 A1 | 9/2005 | Lu et al. |
| 2005/0236201 A1 | 10/2005 | Spannheimer et al. |
| 2005/0236896 A1 | 10/2005 | Offerle et al. |
| 2006/0041358 A1 | 2/2006 | Hara |
| 2006/0071447 A1 | 4/2006 | Gehring et al. |
| 2006/0076828 A1 | 4/2006 | Lu et al. |
| 2006/0103511 A1 | 5/2006 | Lee et al. |
| 2006/0111820 A1 | 5/2006 | Goetting et al. |
| 2006/0142936 A1 | 6/2006 | Dix |
| 2006/0155455 A1 | 7/2006 | Lucas et al. |
| 2006/0244579 A1 | 11/2006 | Raab |
| 2007/0027581 A1 | 2/2007 | Bauer et al. |
| 2007/0090688 A1 | 4/2007 | Haemmerling et al. |
| 2007/0132560 A1 | 6/2007 | Nystrom et al. |
| 2007/0152424 A1 | 7/2007 | Deng et al. |
| 2007/0285808 A1 | 12/2007 | Beale |
| 2008/0143593 A1 | 6/2008 | Graziano et al. |
| 2008/0147277 A1 | 6/2008 | Lu et al. |
| 2008/0231701 A1 | 9/2008 | Greenwood et al. |
| 2008/0312792 A1 | 12/2008 | Dechamp |
| 2009/0005932 A1 | 1/2009 | Lee et al. |
| 2009/0079828 A1 | 3/2009 | Lee et al. |
| 2009/0085775 A1 | 4/2009 | Otsuka et al. |
| 2009/0093928 A1 | 4/2009 | Getman et al. |
| 2009/0198425 A1 | 8/2009 | Englert |
| 2009/0228182 A1 | 9/2009 | Waldbauer et al. |
| 2009/0248346 A1 | 10/2009 | Fennel et al. |
| 2009/0300701 A1 | 12/2009 | Karaoguz et al. |
| 2009/0306861 A1 | 12/2009 | Schumann et al. |
| 2010/0063702 A1 | 3/2010 | Sabelstrom et al. |
| 2010/0171828 A1 | 7/2010 | Ishii |
| 2010/0332049 A1 | 12/2010 | Sy et al. |
| 2011/0001825 A1 | 1/2011 | Hahn |
| 2011/0018231 A1 | 1/2011 | Collenberg |
| 2011/0022282 A1 | 1/2011 | Wu et al. |
| 2011/0087398 A1 | 4/2011 | Lu et al. |
| 2011/0112721 A1 | 5/2011 | Wang et al. |
| 2011/0125457 A1 | 5/2011 | Lee et al. |
| 2011/0160956 A1 | 6/2011 | Chung et al. |
| 2011/0257860 A1 | 10/2011 | Getman et al. |
| 2012/0041658 A1 | 2/2012 | Turner |
| 2012/0086808 A1 | 4/2012 | Lynam et al. |
| 2012/0095649 A1 | 4/2012 | Klier et al. |
| 2012/0109471 A1 | 5/2012 | Wu |
| 2012/0112434 A1 | 5/2012 | Albers et al. |
| 2012/0185131 A1 | 7/2012 | Headley |
| 2012/0200706 A1 | 8/2012 | Greenwood et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0283910 A1 | 11/2012 | Lee et al. |
| 2012/0310594 A1 | 12/2012 | Watanabe |
| 2013/0006472 A1 | 1/2013 | McClain et al. |
| 2013/0024064 A1 | 1/2013 | Shepard |
| 2013/0027195 A1 | 1/2013 | Van Wiemeersch et al. |
| 2013/0082453 A1 | 4/2013 | Padula |
| 2013/0158863 A1 | 6/2013 | Skvarce et al. |
| 2013/0179038 A1 | 7/2013 | Goswami et al. |
| 2013/0207834 A1 | 8/2013 | Mizutani et al. |
| 2013/0226390 A1 | 8/2013 | Luo et al. |
| 2013/0250114 A1 | 9/2013 | Lu |
| 2013/0261843 A1 | 10/2013 | Kossira et al. |
| 2013/0268160 A1 | 10/2013 | Trombley et al. |
| 2014/0005918 A1 | 1/2014 | Qiang |
| 2014/0025260 A1 | 1/2014 | McClure |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0085472 A1 | 3/2014 | Lu et al. |
| 2014/0088824 A1 | 3/2014 | Ishimoto |
| 2014/0160276 A1 | 6/2014 | Pliefke et al. |
| 2014/0172232 A1 | 6/2014 | Rupp et al. |
| 2014/0183841 A1 | 7/2014 | Jones |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |

(56) References Cited

U.S. PATENT DOCUMENTS

| | | |
|---|---|---|
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0277941 A1 | 9/2014 | Chiu et al. |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Snit et al. |
| 2014/0324295 A1 | 10/2014 | Lavoie |
| 2014/0343795 A1 | 11/2014 | Lavoie |
| 2014/0358429 A1 | 12/2014 | Shutko et al. |
| 2014/0379217 A1 | 12/2014 | Rupp et al. |
| 2015/0002670 A1 | 1/2015 | Bajpai |
| 2015/0035256 A1 | 2/2015 | Klank et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0105975 A1 | 4/2015 | Dunn |
| 2015/0115571 A1 | 4/2015 | Zhang et al. |
| 2015/0120141 A1 | 4/2015 | Lavoie et al. |
| 2015/0120143 A1 | 4/2015 | Schlichting |
| 2015/0134183 A1 | 5/2015 | Lavoie et al. |
| 2015/0138340 A1 | 5/2015 | Lavoie |
| 2015/0149040 A1 | 5/2015 | Hueger et al. |
| 2015/0158527 A1 | 6/2015 | Hafner et al. |
| 2015/0165850 A1 | 6/2015 | Chiu et al. |
| 2015/0197278 A1 | 7/2015 | Boos et al. |
| 2015/0203156 A1 | 7/2015 | Hafner et al. |
| 2015/0210254 A1 | 7/2015 | Pieronek et al. |
| 2015/0210317 A1 | 7/2015 | Hafner et al. |
| 2015/0217693 A1 | 8/2015 | Pliefke et al. |
| 2015/0269444 A1 | 9/2015 | Lameyre et al. |
| 2016/0001705 A1 | 1/2016 | Greenwood et al. |
| 2016/0009288 A1 | 1/2016 | Yu |
| 2016/0039456 A1 | 2/2016 | Lavoie et al. |
| 2016/0059780 A1 | 3/2016 | Lavoie |
| 2016/0059888 A1 | 3/2016 | Bradley et al. |
| 2016/0059889 A1 | 3/2016 | Herzog et al. |
| 2016/0096549 A1 | 4/2016 | Herzog et al. |
| 2016/0129939 A1 | 5/2016 | Singh et al. |
| 2016/0152263 A1 | 6/2016 | Singh et al. |
| 2016/0153778 A1 | 6/2016 | Singh et al. |
| 2016/0229452 A1 | 8/2016 | Lavoie et al. |
| 2016/0280267 A1 | 9/2016 | Lavoie et al. |
| 2017/0073005 A1 | 3/2017 | Ghneim et al. |
| 2017/0101130 A1 | 4/2017 | Lavoie |
| 2017/0106796 A1 | 4/2017 | Lavoie et al. |
| 2017/0174130 A1 | 6/2017 | Hu et al. |
| 2017/0297619 A1 | 10/2017 | Lavoie et al. |
| 2017/0297620 A1 | 10/2017 | Lavoie et al. |
| 2017/0313351 A1 | 11/2017 | Lavoie |
| 2018/0109762 A1* | 4/2018 | Aich ................ B60R 1/003 |
| 2018/0251153 A1 | 9/2018 | Li et al. |
| 2018/0253608 A1 | 9/2018 | Diessner et al. |

FOREIGN PATENT DOCUMENTS

| | | |
|---|---|---|
| DE | 3923676 A1 | 1/1991 |
| DE | 3931518 A1 | 4/1991 |
| DE | 9208595 U1 | 8/1992 |
| DE | 19526702 A1 | 2/1997 |
| DE | 10030738 C1 | 8/2001 |
| DE | 10031244 A1 | 1/2002 |
| DE | 10065230 A1 | 7/2002 |
| DE | 10122562 C1 | 7/2002 |
| DE | 10154612 A1 | 5/2003 |
| DE | 10312548 B3 | 5/2004 |
| DE | 10333998 A1 | 2/2005 |
| DE | 102004050149 A1 | 4/2006 |
| DE | 102005042957 A1 | 3/2007 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102006048947 A1 | 4/2008 |
| DE | 102006056408 A1 | 6/2008 |
| DE | 102008020838 A1 | 11/2008 |
| DE | 102007029413 A1 | 1/2009 |
| DE | 102008045436 A1 | 3/2010 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102009027041 A1 | 12/2010 |
| DE | 102009038552 A1 | 2/2011 |
| DE | 102010006323 A1 | 8/2011 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102010029184 A1 | 11/2011 |
| DE | 102010045519 A1 | 3/2012 |
| DE | 102011104256 A1 | 7/2012 |
| DE | 102011101990 B3 | 10/2012 |
| DE | 102012005707 A1 | 10/2012 |
| DE | 202012010517 U | 12/2012 |
| DE | 102011108440 A1 | 1/2013 |
| DE | 102011120814 A1 | 6/2013 |
| DE | 102012006206 A1 | 10/2013 |
| DE | 102012206133 A1 | 10/2013 |
| DE | 102012019234 A1 | 4/2014 |
| DE | 102013000198 A1 | 7/2014 |
| EP | 0418653 A1 | 3/1991 |
| EP | 0433858 A2 | 6/1991 |
| EP | 1361543 A2 | 11/2003 |
| EP | 1593552 B1 | 3/2007 |
| EP | 1810913 A1 | 7/2007 |
| EP | 2388180 A2 | 11/2011 |
| EP | 2452549 A1 | 5/2012 |
| EP | 2487454 A2 | 8/2012 |
| EP | 2551132 A1 | 1/2013 |
| EP | 2644477 A1 | 10/2013 |
| EP | 2803944 A2 | 11/2014 |
| FR | 2515379 A1 | 4/1983 |
| GB | 2265587 A | 10/1993 |
| GB | 2342630 A | 4/2000 |
| GB | 2398048 A | 8/2004 |
| GB | 2398049 A | 8/2004 |
| GB | 2398050 A | 8/2004 |
| JP | 61006458 | 1/1986 |
| JP | 6159491 A | 3/1986 |
| JP | 6385568 U | 6/1988 |
| JP | 01095980 A | 4/1989 |
| JP | 01095981 A | 4/1989 |
| JP | 09267762 A | 10/1997 |
| JP | 09328078 A | 12/1997 |
| JP | 10001063 A | 1/1998 |
| JP | 11124051 A | 5/1999 |
| JP | 11278319 A | 10/1999 |
| JP | 2002012172 A | 1/2002 |
| JP | 2002068032 A | 3/2002 |
| JP | 2003034261 A | 2/2003 |
| JP | 2003148938 A | 5/2003 |
| JP | 3716722 B2 | 11/2005 |
| JP | 2008027138 A1 | 2/2008 |
| JP | 2012105158 A | 5/2012 |
| JP | 2012166647 A | 9/2012 |
| JP | 2014002056 A | 1/2014 |
| WO | 8503263 A1 | 8/1985 |
| WO | 0044605 A1 | 8/2000 |
| WO | 2005005200 A2 | 1/2005 |
| WO | 2005116688 A2 | 12/2005 |
| WO | 2006042665 A1 | 4/2006 |
| WO | 2012059207 A1 | 5/2012 |
| WO | 2012103193 A1 | 8/2012 |
| WO | 2014019730 A1 | 2/2014 |
| WO | 2014037500 A1 | 3/2014 |
| WO | 2014070047 A1 | 5/2014 |
| WO | 2014092611 A1 | 6/2014 |
| WO | 2014123575 A1 | 8/2014 |

(56) References Cited

FOREIGN PATENT DOCUMENTS

| WO | 2015074027 A1 | 5/2015 |
|----|---------------|--------|
| WO | 2015187467 A1 | 12/2015 |
| WO | 2017123880 A1 | 7/2017 |

OTHER PUBLICATIONS

F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.
"Ford Super Duty: Truck Technologies", Brochure, Sep. 2011, 2 pages.
Kristopher Bunker, "2012 Guide to Towing", Trailer Life, 2012, 38 pages.
A. Gonzalez-Cantos, "Backing-Up Maneuvers of Autonomous Tractor-Trailer Vehicles using the Qualitative Theory of Nonlinear Dynamical Systems," International Journal of Robotics Research, Jan. 2009, vol. 28, 1 page.
L. Chu, Y. Fang, M. Shang, J. Guo, F. Zhou, "Estimation of Articulation Angle for Tractor Semi-Trailer Based on State Observer", ACM Digital Library, ICMTMA '10 Proceedings of the 2010 International Conference on Measuring Technology and Automation, vol. 2, Mar. 2010, 1 page.
M. Wagner, D. Zoebel, and A. Meroth, "Adaptive Software and Systems Architecture for Driver Assistance Systems" International Journal of Machine Learning and Computing, Oct. 2011, vol. 1, No. 4, 7 pages.
F.W. Kienhöfer; D. Cebon, "An Investigation of ABS Strategies for Articulated Vehicles", Cambridge University, Engineering Department, United Kingdom, date unknown, 13 pages.
C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, 8 pages.
Zhe Leng; Minor, M., "A Simple Tractor-Trailer Backing Control Law for Path Following", IEEE, Intelligent Robots and Systems (IROS) IEEE/RSJ International Conference, Oct. 2010, 2 pages.
Kinjo, H.; Maeshiro, M.; Uezato, E.; Yamamoto, T., "Adaptive Genetic Algorithm Observer and its Application to Trailer Truck Control System", IEEE, SICE-ICASE International Joint Conference, Oct. 2006, 2 pgs.
J. Roh; H. Lee; W. Chung, "Control of a Car with a Trailer Using the Driver Assistance System", IEEE, International Conference on Robotics and Biomimetics; Phuket, Thailand, Dec. 2011, 6 pages.
A. Gonzalez-Cantos; J.I. Maza; A. Ollero, "Design of a Stable Backing Up Fuzzy Control of Autonomous Articulated Vehicles for Factory Automation", Dept. of Systems Engineering and Automatic Control, University of Seville, Spain, 2001, 5 pages.
Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pages.
Zare, A. Sharafi; M. Kamyad, A.V., "A New Approach in Intelligent Trailer Parking", IEEE, 2010 2nd International Mechanical and Electrical Technology (ICMET), Sep. 2010, 1 page.
Tanaka, K.; Sano, M., "A Robust Stabilization Problem of Fuzzy Control Systems and its Application to Backing up Control of a Truck-trailer", IEEE Transactions on Fuzzy Systems, May 1994, vol. 2, No. 2, 1 page.
Sharafi, M. Zare; A. Kamyad; A.V. Nikpoor, S., "Intelligent Parking Method for Truck in Presence of Fixed and Moving Obstacles and Trailer in Presence of Fixed Obstacles: Advanced Fuzzy Logic Technologies in Industrial Applications", IEEE, 2010 International Electronics and Information Engineering (ICEIE), Aug. 2010, vol. 2, 1 page.
Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 2007, 1 page.
Sharafi, M. Zare; A. Kamyad; A.V. Nikpoor, S., "Intelligent Parking Method for Trailers in Presence of Fixed and Moving Obstacles", IEEE, 2010 3rd International Conference on Advanced Computer Theory and Engineering (ICACTE), Aug. 2010, vol. 6, 1 page.
Chieh Chen; Tomizuka, M., "Steering and Independent Braking Control for Tractor-Semitrailer Vehicles in Automated Highway Systems", IEEE, Proceedings of the 34th IEEE Conference on Decision and Control, Dec. 1995, vol. 2, 1 page.
P. Bolzern, R.M. Desantis, A. Locatelli, "An Input-Output Linearization Approach to the Control of an n-Body Articulated Vehicle", J. Dyn. Sys., Meas., Control, Sep. 2001, vol. 123, No. 3, 3 pages.
Dieter Zöbel, David Polock, Philipp Wojke, "Steering Assistance for Backing Up Articulated Vehicles", Systemics, Cybernetics and Informatics; vol. 1, No. 5, date unknown, 6 pages.
J.R. Billing; J.D. Patten; R.B. Madill, "Development of Configurations for Infrastructure-Friendly Five- and Six-Axle SemiTrailers", National Research Council of Canada and Ontario Ministry of Transportation, date unknown, 11 pages.
Jesus Morales, Anthony Mandow, Jorge L. Martinez, and Alfonso Garcia-Cerezo, "Driver Assistance System for Backward Maneuvers in Passive Multi-Trailer Vehicles", IEEE/RSJ International Conference on Intelligent Robots and Systems (IROS), Oct. 2012, 7 pages.
Cedric Pradalier and Kane Usher, "Experiments in Autonomous Reversing of a Tractor-Trailer System", 6th International Conference on Field and Service Robotics, inria-00195700, Version 1, Dec. 2007, 10 pages.
Andri Riid, Alar Leibak, Ennu Rüstern, "Fuzzy Backing Control of Truck and Two Trailers", Tallinn University of Technology; Tallinn, Estonia, date unknown, 6 pages.
Jane Mcgrath, "How to Avoid Jackknifing", A Discovery Company, date unknown, 3 pages.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, 14 pages.
Jujnovich, B.; Roebuck, R.; Odhams, A.; David, C., "Implementation of Active Rear Steering of a Tractor Semitrailer", Cambridge University, Engineering Department; Cambridge, United Kingdom, date unknown, 10 pages.
A.M.C. Odhams; R.L. Roebuck; C. Cebon, "Implementation of Active Steering on a Multiple Trailer Long Combination Vehicle", Cambridge University, Engineering Department; Cambridge, United Kingdom, date unknown, 13 pages.
Cedric Pradalier and Kane Usher, "Robust Trajectory Tracking for a Reversing Tractor-Trailer System", (Draft), Field and Service Robotics Conference, CSIRO ICT Centre, Jul. 2007, 16 pages.
Stahn, R.; Heiserich, G.; Stopp, A., "Laser Scanner-Based Navigation for Commercial Vehicles", IEEE, 2007 IEEE Intelligent Vehicles Symposium, Jun. 2007, 1 page.
Lee Yong H.; Weiwen Deng; Chin Yuen-Kwok Steve; McKay Neil, "Feasibility Study for a Vehicle-Trailer Backing Up Control", Refdoc.fr, SAE Transactions, vol. 113, No. 6, 2004, 1 page.
A.M.C. Odhams; R.L. Roebuck; B.A. Jujnovich; D. Cebon, "Active Steering of a Tractor- Semi- Trailer" Proceedings of the Institution of Mechanical Engineers, Part D: Journal of Automobile Engineering, Sage Journals, vol. 225, No. 7, Jul. 2011, 1 page.
Haviland, G S, "Automatic Brake Control for Trucks—What Good Is It?", TRID, Society of Automotive Engineers, Sep. 1968, 1 page.
William E. Travis; David W. Hodo; David M. Bevly; John Y. Hung, "UGV Trailer Position Estimation Using a Dynamic Base RTK System", American Institute of Aeronautics and Astronautics, date unknown, 12 pages.
"VSE Electronic Trailer Steering", ETS for Trailers, version 2009, VSE Trailer Systems B.V., 2009, 28 pages.
"Telematics Past, Present, and Future," Automotive Service Association, www.ASAshop.org, May 2008, 20 pages.
"Fully Automatic Trailer Tow Hitch With LIN Bus," https://webista.bmw.com/webista/show?id=1860575499&lang=engb&print=1, date unknown, 5 pages.
"VBOX Yaw Rate Sensor With Integral Accelerometers," Racelogic, www.racelogic.co.uk, date unknown, 2 pages.
P.D.C.R Jayarathna; J.V Wijayakulasooriya; S.R Kodituwakku, "Fuzzy Logic and Neural Network Control Systems for Backing up

(56) References Cited

OTHER PUBLICATIONS a Truck and a Trailer", International Journal of Latest Trends in Computing, vol. 2, No. 3, Sep. 2011, 8 pages.

Olof Enqvist, "AFS-Assisted Trailer Reversing," Institutionen för systemteknik Deartment of Electrical Engineering, Jan. 27, 2006, 57 pages.

Novak, Domen; Dovzan, Dejan; Grebensek, Rok; Oblak, Simon, "Automated Parking System for a Truck and Trailer", International Conference on Advances in the Internet, Processing, Systems and Interdisciplinary Research, Florence, 2007, WorldCat.org, 13 pgs.

Commonly assigned U.S. Appl. No. 16/199,851, filed Nov. 26, 2018, entitled Trailer Angle Detection Using End-To-End Learning (FOR025 P2085).

\* cited by examiner

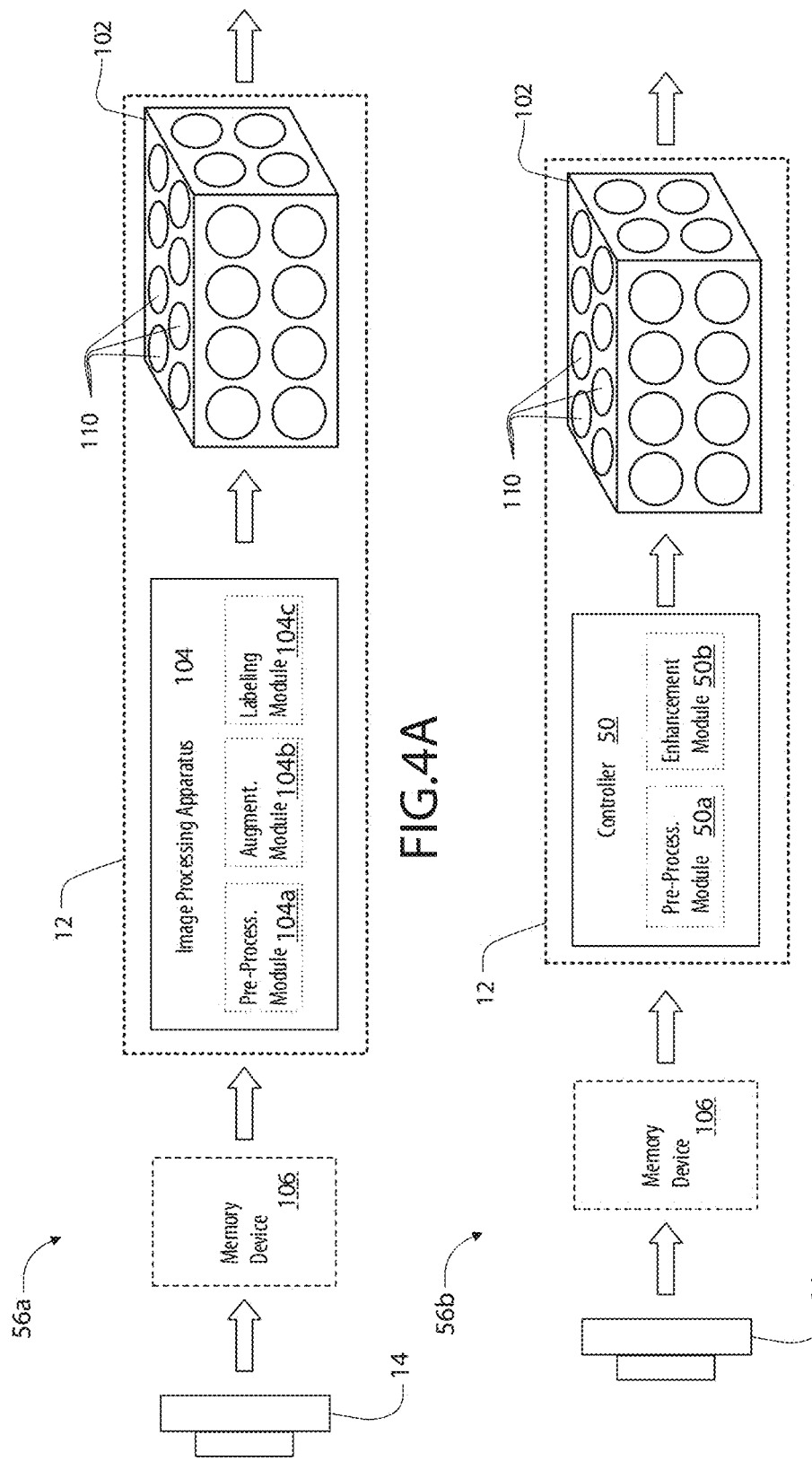

TRAILER ANGLE DETECTION USING END-TO-END LEARNING

FIELD OF THE INVENTION

The present invention generally relates to trailer backup assist systems, and, more particularly, to trailer backup assist systems employing trailer angle detection through image processing.

BACKGROUND OF THE INVENTION

Reversing a vehicle while towing a trailer can be challenging for many drivers, particularly for drivers that drive with a trailer on an infrequent basis or with various types of trailers. Some systems used to assist a driver in backing a trailer rely on trailer angle measurements to determine the position of the trailer relative to the vehicle. Thus, the accuracy and reliability of the trailer angle measurements can be critical to the operation of the trailer backup assist system.

SUMMARY OF THE INVENTION

According to one aspect of the present invention, a method for training an image-based trailer identification system is disclosed. The method comprises capturing a plurality of captured images in a field of view and identifying a detected trailer angle for a trailer in connection with a vehicle in each of the captured images. The method further comprises comparing the captured images and the corresponding trailer angles to a predetermined image set comprising a plurality of teaching trailer angles and identifying at least one required trailer angle of the teaching trailer angles that is not included in the captured images. Based on the captured images, a simulated angle image is generated. The simulated image comprises a depiction of the trailer in connection with the vehicle at the at least one required angle not included in the captured images. The method further comprises supplying the simulated angle image to the identification system for training.

The method may further comprise one or more of the following steps alone or in various combinations. The additional steps of the method may include the following:
- the identifying of the detected trailer angle is determined by digitally processing the image data via a feature extraction technique;
- the feature extraction technique comprises a least one of a line detection;
- the identification system comprises a neural network;
- the plurality of teaching trailer angles comprises a range of trailer angles for identification;
- the plurality of teaching trailer angles comprises an increment between each trailer angle in the range of trailer angles;
- detecting a lighting condition in the captured images and comparing the lighting condition to a required lighting condition for training the identification system;
- in response to the lighting condition of the captured images differing from the required lighting condition, adjusting the lighting of at least one of the captured images to generate the simulated lighting image;
- supplying the simulated lighting image to the identification system for training;
- the image data is captured by a plurality of vehicles, each configured to capture the images in the field of view; and/or
- storing the captured images from the plurality of vehicles and compiling the captured images for comparing the captured images.

According to another aspect of the present invention, a system for training a neural network is disclosed. The system comprises at least one imaging device configured to capture a plurality of captured images of a trailer in connection with a vehicle and an image processing apparatus. The image processing apparatus is configured to identify a detected trailer angle from each of the captured images based on an image processing routine and compare the captured images and the corresponding detected trailer angles to a predetermined image set comprising a plurality of teaching trailer angles. The image processing apparatus is further configured to identify at least one required trailer angle of the teaching trailer angles that is not included in the captured images and generate a simulated angle image based on the captured images. The simulated angle image comprises a depiction of the trailer in connection with the vehicle at the at least one required angle not included in the captured images. The simulated angle image is supplied to the neural network for training.

The system may further comprise one or more of the following elements alone or in various combinations. The additional elements may include the following:
- the simulated angle image comprises a depiction of the trailer in connection with the vehicle at the at least one required angle not included in the captured images;
- the image processing routine comprises a digital image processing technique comprising a feature extraction technique;
- the feature extraction technique comprises a least one of a line detection;
- the plurality of teaching trailer angles comprises a range of trailer angles for identification;
- the plurality of teaching trailer angles comprises an increment between each trailer angle in the range of trailer angles;
- detect a lighting condition in the captured images and compare the lighting condition to a required lighting condition for training the identification system; and/or
- in response to the lighting condition of the captured images differing from the required lighting condition, adjust the lighting of at least one of the captured images and generate the simulated lighting image.

According to yet another aspect of the present invention, a system for training a neural network is disclosed. The system comprises at least one imaging device configured to capture a plurality of captured images of a trailer in connection with a coupler of a vehicle and an image processing apparatus. The image processing apparatus is configured to identify a first trailer type in the captured images based on a feature extraction technique configured to identify at least one feature of the trailer relative to the coupler and compare the first trailer type to a plurality of teaching trailer types. The image processing apparatus is further configured to generate a simulated trailer image comprising a second trailer type of the plurality of teaching trailer types that is not included in the captured images and supply the simulated trailer image to the neural network for training.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 4A is a process diagram of a training process for a neural network configured to estimate an angle between a vehicle and a trailer;

FIG. 4B is a process diagram of an operating process for a neural network configured to estimate an angle between a vehicle and a trailer;

DETAILED DESCRIPTION OF THE PREFERRED EMBODIMENTS

For purposes of description herein, it is to be understood that the disclosed trailer backup assist system and the related methods may assume various alternative embodiments and orientations, except where expressly specified to the contrary. It is also to be understood that the specific devices and processes illustrated in the attached drawings, and described in the following specification, are simply exemplary embodiments of the inventive concepts defined in the appended claims. While various aspects of the trailer backup assist system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
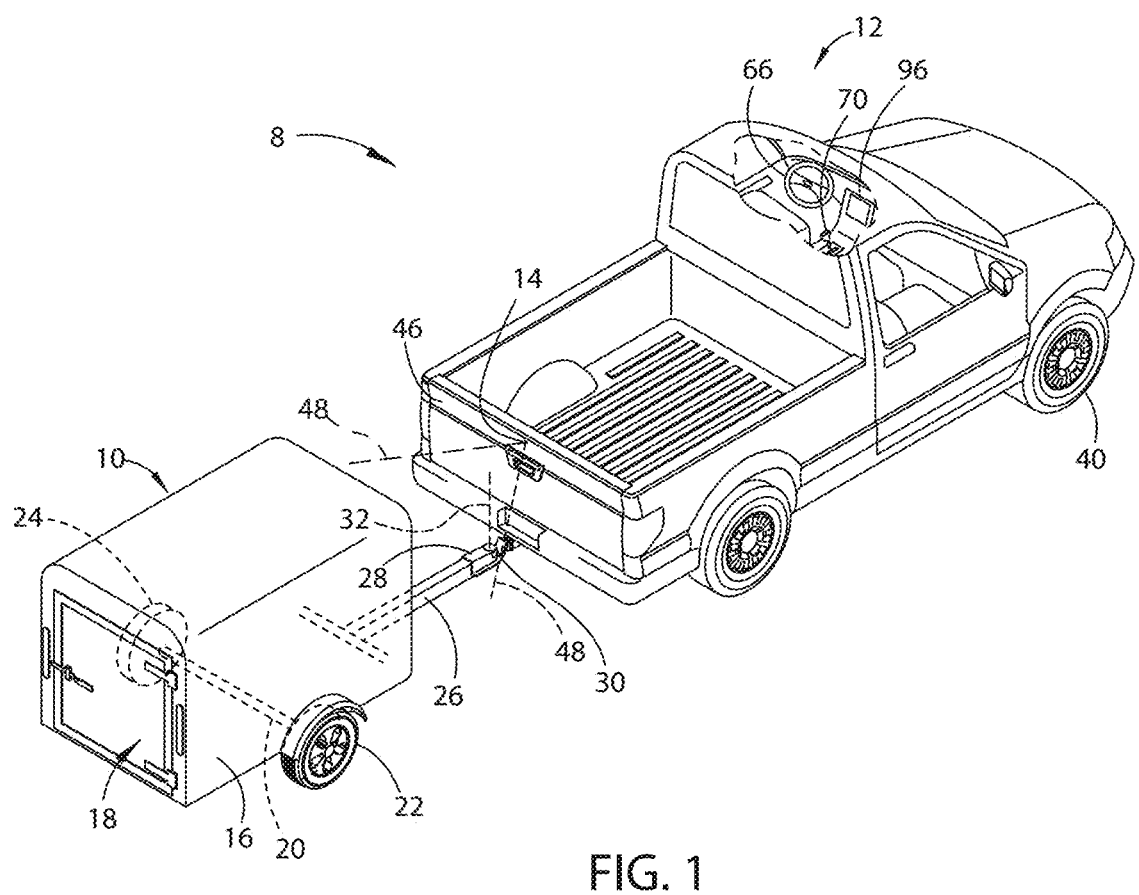
FIG. 1 is a top perspective view of a vehicle attached to a trailer with one embodiment of a trailer angle sensor for operating a trailer backup assist system.
Figure 2:
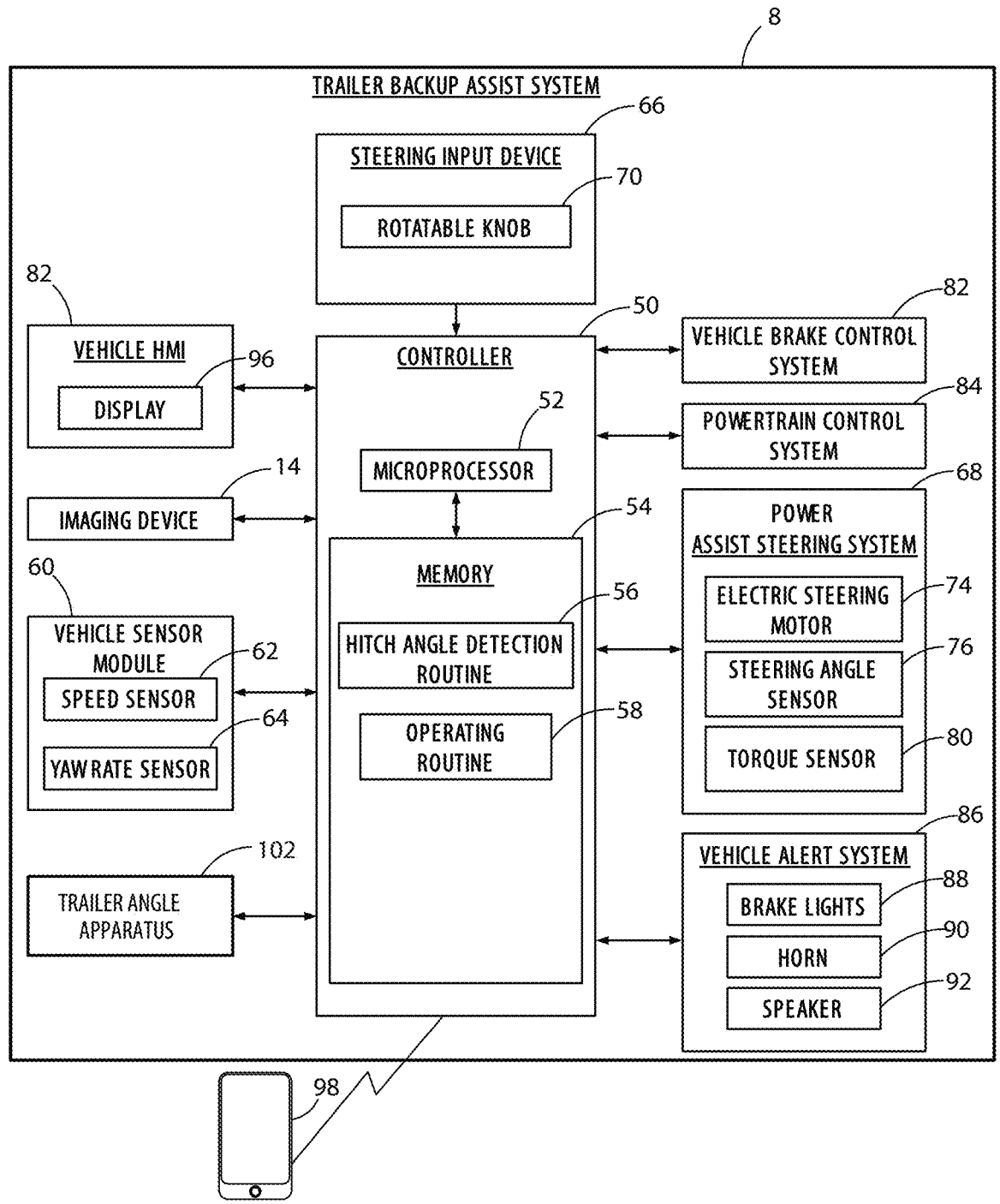
FIG. 2 is a block diagram illustrating one embodiment of the trailer backup assist system.
Figure 3:
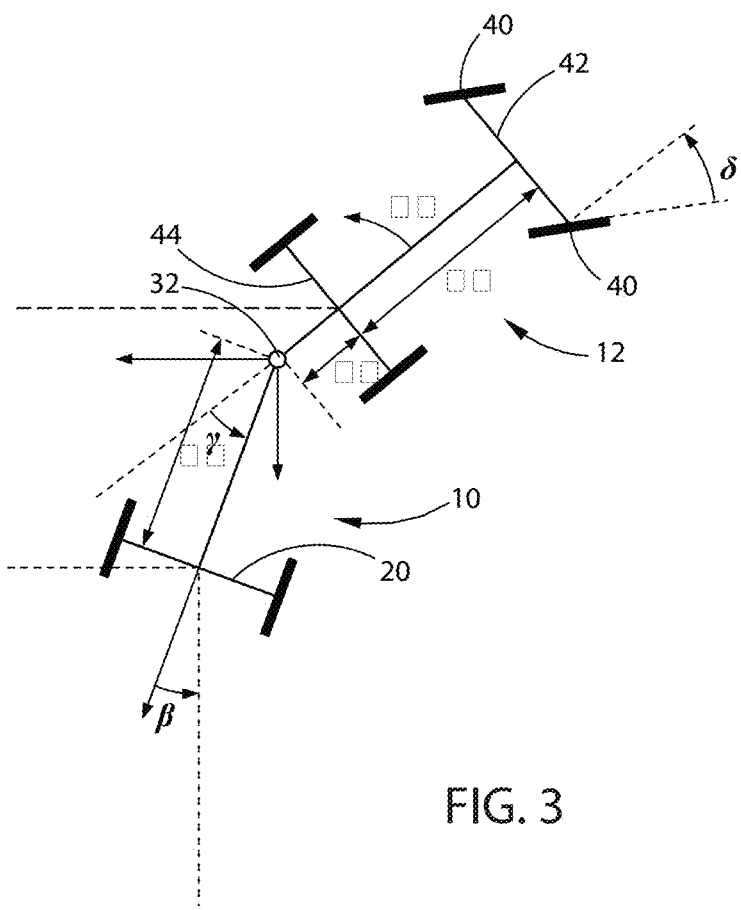
FIG. 3 is a kinematic model of the vehicle and trailer shown in FIG. 1.

Referring to FIGS. 1, 2, and 3, reference numeral 10 generally designates a trailer backup assist system for controlling a backing path of a trailer 10 attached to a vehicle 12. The system may allow a driver of the vehicle 12 to specify a desired curvature of the backing path of the trailer 10. In order to achieve such operation, a trailer angle $\gamma$ (shown in FIG. 3) between the vehicle 12 and the trailer 10 may be monitored to provide feedback to the system 8 throughout operation. However, accurately detecting the trailer angle $\gamma$ may be challenging when considering the wide variations in trailer hitch types, weather-related visibility conditions, lighting conditions, trailer angle ranges, and various additional variables that may cause variations in measurement. In order to improve the reliability of identifying the trailer angle $\gamma$, the disclosure provides for an improved system and method for end-to-end learning to identify a trailer angle $\gamma$.

In particular, the disclosure provides for the detection of the trailer angle $\gamma$ based on the image data captured by an imaging device 14. Based on the image data captured by the imaging device 14, the system 8 may identify various characteristics of the trailer 10 based on a variety of image processing techniques (e.g. edge detection, background subtraction, template matching etc.). However, due to variations related in the trailer 10 and the local environment (e.g. shadows, textured surfaces, noise, etc.), conventional image processing techniques may not be sufficiently robust to reliably and accurately monitor the trailer angle $\gamma$ without the aid of additional sensors.

As discussed herein, the improved systems and methods may utilize neural networks to improve the reliability and accuracy of the identified trailer angle $\gamma$ to improve operation of the system 8. The neural networks and related methods may be configured to learn how to accurately detect the trailer angle $\gamma$ without human intervention such that the resulting neural network may accurately identify the trailer angle solely based on image data acquired from the imaging device 14. Accordingly, the methods and systems discussed herein, may detect the trailer angle $\gamma$ reliably without the aid of additional sensors, patterned markers or visual cues, or other aids that may otherwise be required to enable accurate operation of the system 8.

As further discussed in reference to FIGS. 3-6, the invention disclosure provides a solution for the detection of the trailer angle $\gamma$ based on deep learning and convolutional networks. In this way, the system 8 may reliably estimate the trailer angle $\gamma$ based on an end-to-end approach for angle estimation utilizing only the existing backup camera (e.g. imaging device 14 of the vehicle 12). As discussed herein, the deep neural networks provided for the detection of the trailer angle $\gamma$ may contain thousands or millions of tunable parameters. Based on these parameters, the system 8 may accurately represent highly non-linear models while being very robust to noise. In some embodiments, convolutional layers may be trained to detect diverse features, similarly to human perception as such networks are capable of generalizing scenarios for later detection.

A drawback related to the implementation of deep convolution neural networks may include the labor-intensive involvement from human operators. For example, in order to provide feedback to the network, a human operator may be required to label and review thousands of samples to ensure accurate learning and operation of the network. Accordingly, in addition to providing the application of neural networks to identify the trailer angle $\gamma$, the disclosure also provides for methods of programming and training the neural networks discussed herein. These and other aspects of the disclosure are further detailed in the following description.

Referring still to FIGS. 1, 2, and 3, the vehicle 12 is embodied as a pickup truck that is pivotally attached to one embodiment of the trailer 10. The trailer 10 may comprise a box frame 16 with an enclosed cargo area 18. An axle 20 of the trailer may be operably coupled to wheels 22 and 24, and a tongue 26 may extend longitudinally forward from the enclosed cargo area 18. The illustrated trailer 10 comprises a trailer hitch connector in the form of a coupler assembly 28. The coupler assembly 28 is connected to a vehicle 12 via a hitch ball 30, which may be connected to the vehicle 12 by a drawbar. In operation, the coupler assembly 28 may latch onto the hitch ball 30 to provide a pivoting hitch point 32 that allows for articulation of the trailer angle γ between the vehicle 12 and the trailer 10.

As shown in FIG. 3, the trailer angle γ is shown in relation to a number of parameters of the vehicle 12 and the trailer 10. In operation, the kinematic model depicted in FIG. 3 may be utilized as the basis for the system 8 to control the navigation of the vehicle 12 to direct the trailer 10 along a calculated path. During such operations, the system 8 may monitor the trailer angle γ to ensure that the trailer 10 is accurately guided by the vehicle 12. The parameter that may be utilized for the model include, but are not limited to, the following:

δ: steering angle at steered wheels 40 of the vehicle 12;
α: yaw angle of the vehicle 12;
β: yaw angle of the trailer 10;
γ: trailer angle between the vehicle 12 and the trailer 10 (γ=β−α);
W: wheelbase length between a front axle 42 and a rear axle 44 of the vehicle 12;
L: drawbar length between the hitch point 32 and the rear axle 44 of the vehicle 12; and
D: trailer length between the hitch point 32 and axle 20 of the trailer 10 or effective axle for multiple axle trailers.

It should be appreciated that additional embodiments of the trailer 10 may alternatively couple with the vehicle 12 to provide a pivoting connection, such as by connecting with a fifth wheel connector. It is also contemplated that additional embodiments of the trailer 10 may include more than one axle and may have various shapes and sizes configured for different loads and items, such as a boat trailer or a flatbed trailer.

In some embodiments, the trailer backup assist system 8 may also include the imaging device 14 located at the rear of the vehicle 12 and configured to image a rear-vehicle scene. The imaging device 14 may be centrally located at an upper region of a vehicle tailgate 46 such that the imaging device 14 is elevated relative to the tongue 26 of the trailer 10. The imaging device 14 has a field of view 48 located and oriented to capture one or more images that may include the tongue 26 of the trailer 10 and the hitch ball 30, among other things. Captured images or image data may be supplied to a controller 50 of the trailer backup assist system 8. As discussed herein, the image data may be processed by the controller 50 to determine the trailer angle γ between the vehicle 12 and the trailer 10.

Referring now to FIG. 2, the controller 50 may comprise a microprocessor 52 and/or other analog and/or digital circuitry for processing one or more logic routines stored in a memory 54. The logic routines may include one or more trailer angle detection routines 56, which may comprise one or more deep learning neural networks as well as operating routines 58, which may be configured to guide the vehicle 12. Information from the imaging device 14 or other components of the trailer backup assist system 8 may be supplied to the controller 50 via a communication network of the vehicle 12, which can include a controller area network (CAN), a local interconnect network (LIN), or other conventional protocols used in the automotive industry. It should be appreciated that the controller 50 may be a stand-alone dedicated controller or may be a shared controller integrated with the imaging device 14 or other component of the trailer backup assist system 8 in addition to any other conceivable onboard or off-board vehicle control systems.

In an exemplary embodiment, the controller 50 of the trailer backup assist system 8 may be configured to communicate with a variety of vehicle equipment. The trailer backup assist system 8 may include a vehicle sensor module 60 that monitors certain dynamics of the vehicle 12. The vehicle sensor module 60 may generate a plurality of signals that are communicated to the controller 50 and may include a vehicle speed signal generated by a speed sensor 62 and a vehicle yaw rate signal generated by a yaw rate sensor 64. A steering input device 66 may be provided to enable a driver to control or otherwise modify the desired curvature of the backing path of the trailer 10.

The steering input device 66 may be communicatively coupled to the controller 50 in a wired or wireless manner. In this configuration, steering input device 66 may provide the controller 50 with information defining the desired curvature of the backing path of the trailer 10. In response, the controller 50 may process the information and generate corresponding steering commands that are supplied to a power assist steering system 68 of the vehicle 12. In some embodiments, the steering input device 66 may comprise a rotatable knob 70 operable to rotate to positions that may correspond to an incremental change to the desired curvature of a backing path of the trailer 10.

According to some embodiments, the controller 50 of the trailer backup assist system 8 may control the power assist steering system 68 of the vehicle 12 to operate the steered wheels 40 to direct the vehicle 12 in such a manner that the trailer 10 reacts in accordance with the desired curvature of the backing path of the trailer 10. The power assist steering system 68 may be an electric power-assisted steering (EPAS) system that includes an electric steering motor 74 for turning the steered wheels 40 to a steering angle δ based on a steering command generated by the controller 50. In this configuration, the steering angle δ may be sensed by a steering angle sensor 76 of the power assist steering system 68 and provided to the controller 50. The steering command may be provided for autonomously steering the vehicle 12 during a backup maneuver and may alternatively be provided manually via a rotational position (e.g., a steering wheel angle) of the steering input device 66 or the rotatable knob 70.

In some embodiments, the steering input device 66 (e.g. steering wheel) of the vehicle 12 may be mechanically coupled with the steered wheels 40 of the vehicle 12, such that the steering input device 66 may move in concert with steered wheels 40 via an internal torque, thereby preventing manual intervention with the steering input device 66 during autonomous steering of the vehicle 12. In such instances, the power assist steering system 68 may include a torque sensor 80 that senses torque (e.g., gripping and/or turning) on the steering input device 66, which may not be expected from autonomous control of the steering input device 66. Such unexpected torque may be detected by the controller 50 to indicate manual intervention by the driver. In some embodiments, external torque applied to the steering input device 66 may serve as a signal to the controller 50 that the driver has taken manual control and for the trailer backup assist system 8 to discontinue autonomous steering functionality.

The controller 50 of the trailer backup assist system 8 may also communicate with a vehicle brake control system 82 of the vehicle 12 to receive vehicle speed information, such as individual wheel speeds of the vehicle 12. Additionally or alternatively, vehicle speed information may be provided to the controller 50 by a powertrain control system 84 and/or the speed sensor 62, among other conceivable means. It is conceivable that individual wheel speeds may be used to determine a vehicle yaw rate, which can be provided to the controller 50, in the alternative or in addition, to the vehicle yaw rate measured by the yaw rate sensor 64 of the vehicle sensor module 60. In some embodiments, the controller 50 may provide braking commands to the vehicle brake control system 82, thereby allowing the trailer backup assist system 8 to regulate the speed of the vehicle 12 during a backup maneuver of the trailer 10. It should be appreciated that the controller 50 may additionally or alternatively regulate the speed of the vehicle 12 via interaction with the powertrain control system 84.

Through interaction with the power assist steering system 68, the vehicle brake control system 82, and/or the powertrain control system 84 of the vehicle 12, the potential for unacceptable trailer backup conditions can be reduced. Examples of unacceptable trailer backup conditions include, but are not limited to, a vehicle over-speed condition, a high trailer angle rate, trailer angle dynamic instability, a trailer jackknife condition, sensor failure, and the like. In such circumstances, the driver may be unaware of the failure until the unacceptable trailer backup condition is imminent or already happening. In order to avoid such conditions, the controller 50 may be configured to accurately monitor the trailer angle γ thereby providing feedback to ensure accurate operation.

According to some embodiments, the controller 50 may communicate with one or more devices, including a vehicle alert system 86, which may prompt visual, auditory, and tactile warnings. For instance, vehicle brake lights 88 and vehicle emergency flashers may provide a visual alert and a vehicle horn 90 and/or speaker 92 may provide an audible alert. Additionally, the controller 50 and/or vehicle alert system 86 may communicate with a human machine interface (HMI) 82 of the vehicle 12. The HMI 82 may include a touchscreen vehicle display 96, such as a center-stack mounted navigation or entertainment display capable of displaying images indicating the alert. Such an embodiment may be desirable to notify the driver of the vehicle 12 that an unacceptable trailer backup condition is occurring. Further, it is contemplated that the controller 50 may communicate via wireless communication with one or more electronic portable devices, such as portable electronic device 98, which is shown embodied as a smartphone. The portable electronic device 98 may include a display for displaying one or more images and other information to a user. In response, the portable electronic device 98 may provide feedback information, such as visual, audible, and tactile alerts.

Referring now to FIGS. 4A and 4B, an exemplary process diagram of the trailer angle detection routine is shown. In some implementations, trailer angle detection routine may be taught or otherwise programmed based on image or video data captured by the imaging device 14. This image data may then be processed by an image processing apparatus 104 (e.g. a high-performance image processing computer) to identify the trailer angle γ in the image data captured by the imaging device 14. Once the image data is labeled identifying the trailer angle γ, the labeled image data may be supplied to a neural network 102 for training. The neural network 102 may then process the image data and apply the labeled image data to independently identify the trailer angle γ in image data that is not labeled. Accordingly, once the neural network 102 is trained such that the trailer angle γ can successfully be identified by the hitch angle detection routine within an acceptable or predetermined level of error, the system 8 may be configured to utilize the neural network 102 to detect the trailer angle γ by utilizing unlabeled image data captured by the imaging device 14.

In reference to the FIGS. 4A and 4B, the hitch angle detection routine 56 will be described in reference to a training process 56*a* and an operating process 56*b*. The training process 56*a* may utilize one or more image processing techniques to identify the trailer angle γ in each image or frame of the image data. For example, the image processing apparatus 104 may process the image data via a Hough transform to identify lines extending from the coupler assembly 28 in order to identify a directional vector of the trailer 10. Similarly, the image processing apparatus 104 may process the image data by a convolution-based technique and various edge detection and filtering processes. Once the trailer angle γ is identified in the image data, the image data may be labeled with the trailer angle γ and provided as training inputs to the neural network 102.

The image processing apparatus 104 may be implemented as a component of the system 8 and/or as a separate computerized system. In some implementations, the processing requirements and steps necessary to accomplish the training process 56*a* may be more rigorous and/or demanding than the processing steps typically required from the controller 50. Accordingly, the processing steps for the training process 56*a* may be completed by a system comprising increased processing capacity or processing power for image processing to limit an expense of the dedicated hardware provided for the controller 50 in each system 8. For example, the controller 50 utilized for the training process 56*a* may be configured to have more capable image processing engines, processors capable of increased processing speeds, and generally more advanced system architecture than the controller 50 utilized for the operating process 56*b*. In this way, the system 8 may be effectively designed to promote economical manufacturing of the system 8 for training embodiments as well as operating embodiments, which may be incorporated in consumer products (e.g. the vehicle 12).

Referring first to the training process 56*a*, the image processing apparatus 104 may first receive image data from the imaging device 14 depicting the coupler assembly 28. The image data may be supplied sequentially or stored in a memory device 106 and supplied to the image processing apparatus 104 in bulk. Based on the image data, the image processing apparatus 104 may be configured to supply information to the neural network 102 such that the neural network 102 learns how to accurately detect the trailer angle γ. As further discussed herein, the image processing apparatus 104 may further manipulate the image data and monitor the accuracy of the neural network 102 to accommodate a self-supervised deep learning technique embodied by the training process 56*a*. In this way, the training process 56*a* may be configured to train the neural network 102 without requiring specialty hardware (e.g. a hitch angle detection sensor) in connection with the vehicle 12. In this way, the image data may be captured by any vehicle in connection with a trailer and supplied to provide custom training of the neural network 102 and/or improve the training of the neural network 102.

In operation, the image processing apparatus 104 may process the image data via a plurality of processing modules. For example, in some implementations, the image processing apparatus 104 may comprise a pre-processing module 104a. The pre-processing module 104a may be configured to crop each image frame captured by the imaging device 14. The cropping of the image data may be consistently processed based on the positional relationship of the hitch ball 30 in the field of view 48. For example, the hitch ball 30 may be registered or identified in the image data for each image set and corresponding hitch ball 30 for the vehicle 12. Once identified, the controller 50 may be configured to crop the image data from the imaging device 14 based on predetermined extents or a portion of the image data designated in relation to the location of the hitch ball 30 in the field of view 48. In this way, the image data supplied to the neural network 102 may be limited in positional variation to improve the sample data provided to train the neural network 102.

In some embodiments, the controller 50 may further be configured to process the data via an image augmentation module 104b. The image augmentation module 104b may be configured to augment the image data by a variety of techniques. For example, the cropped image data received from the image pre-processing module 104a may be augmented by the image augmentation module 104b by various techniques including, but not limited to, flipping, rotating, translating, scaling, color enhancing, histogram stretching, noise filtering, selective noise inclusion, etc. Following processing of the image data via the image pre-processing module 104a and/or the image augmentation module 104b, the controller 50 may further process the image data via one or more processing techniques or feature extraction techniques (e.g. Hough transform) to identify the trailer angle $\gamma$ and label each frame of the image data via a trailer angle labeling module 104c. In this configuration, the trailer angle labeling module 104c may identify the trailer angle $\gamma$ to be implemented as training data attributed to each of the frames of the image data that may be input into the neural network 102. In this way, the training process 56a may provide for the image data from the imaging device 14 to be processed and input into the neural network 102 with the trailer angle $\gamma$ of each image frame identified in order to train the parameters of the neural network 102 to accurately identify the trailer angle $\gamma$ from only the image data.

Once the image data is received by the neural network 102, a deep learning procedure may be implemented to regress or estimate the trailer angle $\gamma$. For example, the neural network 102 may be implemented as a deep convolutional network. The architecture of the neural network 102 may be a plurality of convolutional networks followed by activation functions. To help avoiding overfitting, dropout layers and other regularization techniques may be implemented. In an exemplary embodiment, fully connected layers at the end of the neural network 102 are responsible identifying that outputting the trailer angle $\gamma$. Since the object of the neural network 102 may be to perform a regression task, an activation function may not be utilized at the output.

In general, the neural network 102 may comprise a plurality of neurons 110, which may be arranged in a three-dimensional array comprising a width, a depth, and a height. The arrangement of the neurons 110 in this configuration may provide for each layer (e.g. dimensional cross-section of the array) to be connected to a small portion of the preceding layer. In this way, the network 102 may process the data through regression to reduce each image to a single vector to identify the trailer angle $\gamma$. Accordingly, the neural network 102 may transform each frame of the image data layer by layer from original pixel values to the final output. In general, the specific architecture of the neural network 102 may vary and as may be understood by those having ordinary skill in the art, the training process 56a may begin with a pre-trained model. In this way, the training process 56a may be utilized to fine-tune the pre-trained, convolutional neural network 102 to accurately detect the trailer angle $\gamma$ from the image data captured by the imaging device 14. Examples of pre-trained models that may be implemented for the training process 56a may include, but are not limited to, the following: LeNet, AlexNet, ZF Net, GoogLe-Net, VGGNet, ResNet, etc.

In order to optimize the training process 56a, the image data supplied to the neural network 102 may be selected to improve the accuracy of the identification of the trailer angle $\gamma$. Accordingly, in some implementations, the image processing apparatus 104 may selectively supply the labeled image data to the neural network 102 based on one or more predetermined parameters. The predetermined parameters utilized to select the image data that is supplied to the neural network 102 may generally be configured to provide image data to the neural network 102 that conforms to a plurality of training requirements. For example, the training requirements may include, but are not limited to a quantity of image samples, a trailer type and environment diversity of the image samples, an angle diversity of the image samples (e.g. variation in trailer angle $\gamma$), and an angle distribution of the image data (e.g. an even distribution of occurrences of the trailer angle $\gamma$ in the image data). Accordingly, the image processing apparatus may select the image frames of the labeled image data such that the image data supplied to the neural network 102 conforms to the training requirements.

The quantity of image samples selected by the image processing apparatus 104 may correspond to an initial requirement necessary to satisfy the diversity and distribution requirements. That is, the quantity of image frames should be numerous enough to depict a variety of trailer types, environmental conditions, and lighting conditions in the image data. As discussed later in reference to FIG. 5, the appearance and corresponding identification of the trailer 10 may widely vary based on the conditions in which the image data is captured. Additionally, the images or image frames selected by the image processing apparatus 104 may vary in trailer angle over a desired range of angles. The requirements for the image data may further include that the trailer angle $\gamma$ is balanced and evenly distributed such that each trailer angle $\gamma$ is represented a similar number of times in the image data. In this way, the image processing apparatus 104 may select the image data to represent a variety of trailer types with approximately even distribution of each angle in an operating range of the system 8.

While the selection of the training of the neural network 102 may be accomplished based solely on the image data in some instances, the image frames captured by the imaging device 14 may not include sufficient variety or samples to satisfy the preferred data set supplied to the training process 56a. For example, the image data may not include a sufficient variety of examples of the trailer angle $\gamma$, variations in the type of the trailer 10, and/or variations in lighting or environmental conditions. Such limitations in the image data may be related to the typical operation of the vehicle 12.

For example, typical sets of image data collected by the imaging device 14 may not include samples of various angles of the trailer angle γ. Such limitations in the image data may be caused by limited variation in the trailer angle γ during common operation. That is, the variation in the trailer angle γ may be less than 20 degrees throughout the vast majority of operation of the system 8. Accordingly, the image processing apparatus 104 may further be configured to generate image frames and/or augment the image data in existing image frames to supplement the image data supplied to the neural network 102. For example, if a trailer angle is missing from the image data captured by the imaging device 14, the image processing apparatus 104 may augment the existing image data and/or generate simulated image data. The augmentation and simulation of the image data is further discussed in reference to FIG. 6.

Figure 5A:
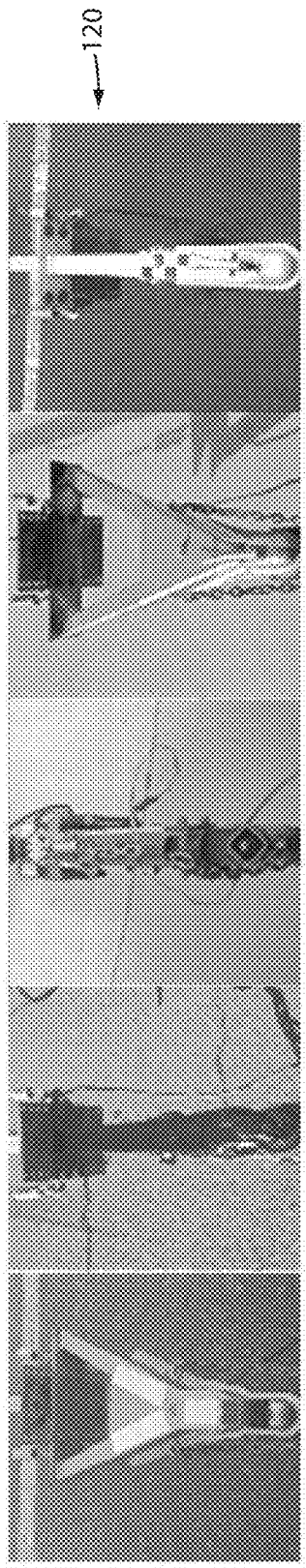
FIG. 5A demonstrates examples of cropped images configured as an input to a neural network demonstrating a plurality of trailer types.
Figure 5B:
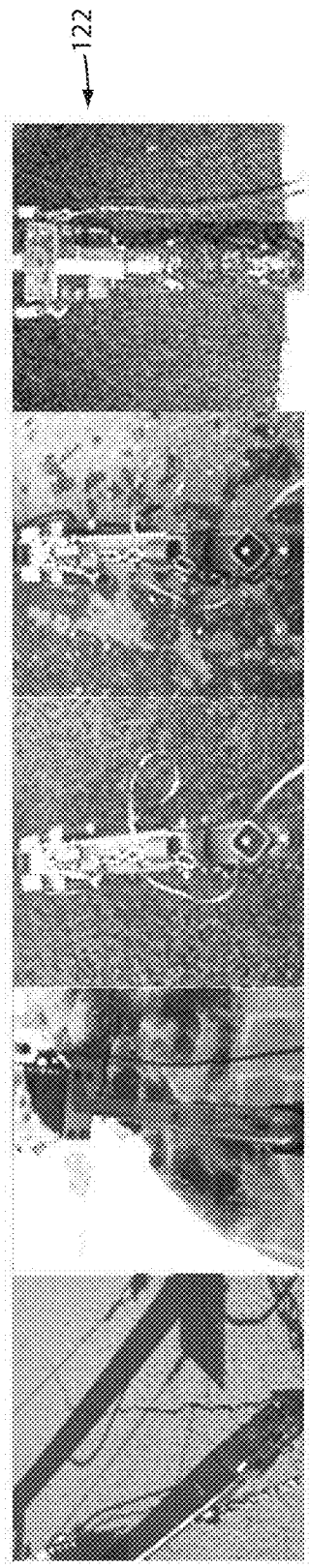
FIG. 5B demonstrates examples of cropped images configured as an input to a neural network demonstrating a plurality of lighting or environmental conditions.

Referring now to FIG. 5B, once the neural network 102 is trained, the operating process 56b of the hitch angle identification routine 56 may be processed without the need of the trailer angle γ identified by the angle labeling module 104c of the image processing apparatus 104. Accordingly, the operation of the operating process 56b may be streamlined to require less processing power than the training process 56a. For example, the controller 50 may similarly process the image data via a pre-processing module 50a. The pre-processing module 50a may be configured to crop each image frame received from the imaging device 14 based on the positional relationship of the hitch ball 30 in the field of view 48. Next, the controller 50 may process the cropped image data via an image enhancement module 50b.

The result of the steps completed by the pre-processing module 50a and/or the enhancement module 50b may generate normal image data that may be more uniform than the image data received directly from the imaging device 14. Such uniformity in proportions in relation to the hitch-ball 30 and image quality (e.g. contrast, noise, etc.) may provide for the trailer angle identification routine 56 to improve the successful identification of the trailer angle γ in the image data without requiring the computationally intensive steps required to identify the trailer angle γ via the angle labeling module 104c of the image processing apparatus 104 as described in the training process 56a. Accordingly, the disclosure may provide for improved operation and accuracy of the system 8 based on both the image processing steps provided by the modules 50a, 50b and the utilization of the neural network 102.

As previously discussed, the neural network 102 may be configured to receive the image data from the pre-processing module 50a and/or the enhancement module 50b. Upon completion of the analysis of each frame of the image data, the controller 50 may output the corresponding trailer angle γ. Accordingly, the systems and methods described herein may provide for the training and physical implementation of the system 8 that may effectively train the neural network 102 such that the trailer angle γ may be accurately identified in a variety of environmental conditions, lighting conditions, and for a variety of trailer topographies and orientations.

Figure 5C:
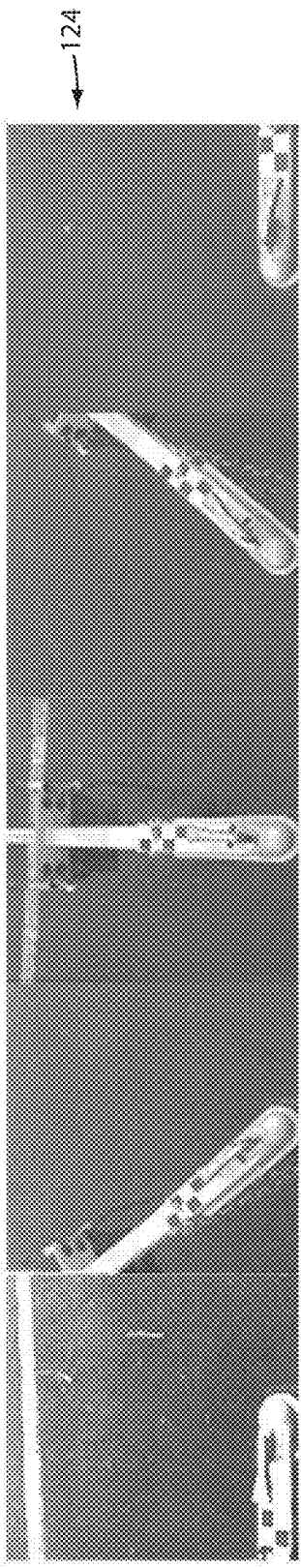
FIG. 5C demonstrates examples of cropped images configured as an input to a neural network demonstrating a plurality of trailer angles.

FIGS. 5A, 5B, and 5C demonstrate image samples of a variety of trailer types, trailer angles, and environmental or lighting conditions. A first set 120 of the image samples demonstrates a plurality of trailer hitch configurations. A second set 122 of the image samples demonstrates a plurality of lighting or environmental conditions for a plurality of trailer hitch configurations. Finally, a third set 124 of the image samples demonstrates a plurality of hitch angles for a trailer hitch configuration. As demonstrated by the image samples, each image sample may vary in appearance based on a significant variety of factors that may change the processing characteristics required for the neural network 102 to accurately identify the trailer angles γ. For this reason, the disclosure may provide for the neural network 102 to be provided a variety of image samples to support the recognition of the trailer angles γ in a variety of conditions.

As shown, each of the images shown in FIGS. 5A, 5B, and 5C are cropped such that the hitch of the coupler assembly 28 is consistently demonstrated in reference to a position of the hitch-ball 30. During the training process 56a and the operating process 56b, the pre-processing modules 104a and 50a may normalize the proportion of the image data such that the neural network 102 may be provided uniform image data to improve the identification of the trailer angle γ. The uniformity may further be adjusted via the image augmentation module 104b for the training process 56a and the image enhancement module 50b for the operating process 56b. The processing steps for each of the image augmentation module 104b and the image enhancement module 50b may be similar in reference to the processing of the images for uniformity. Such uniformity in proportions in relation to the hitch-ball 30 and image quality (e.g. contrast, noise, etc.) may provide for the trailer angle identification routine 56 to improve the successful identification of the trailer angle γ in the image data without requiring the secondary measurements from mechanical detection devices.

As previously discussed, the image processing apparatus 104 may be implemented in the vehicle 12 in some implementations; however, the image processing apparatus 104 may comprise more sophisticated image processing hardware configured to identify the trailer angle γ in the image data for training the neural network 102 via the training process 56a. Once trained, the neural network 102 may operate to identify the trailer angle γ directly from the image data, and, as such, the sophistication and related expense of the controller 50 including the image enhancement module 50b may be diminished relative to the image processing apparatus 104. Additionally, as previously discussed, the training process 56a may be completed by a device separate from the vehicle 12 to limit the expense of the controller 50. Accordingly, the neural network 102 may provide for improved economy while maintaining accurate identification of the trailer angle γ.

Figure 6:
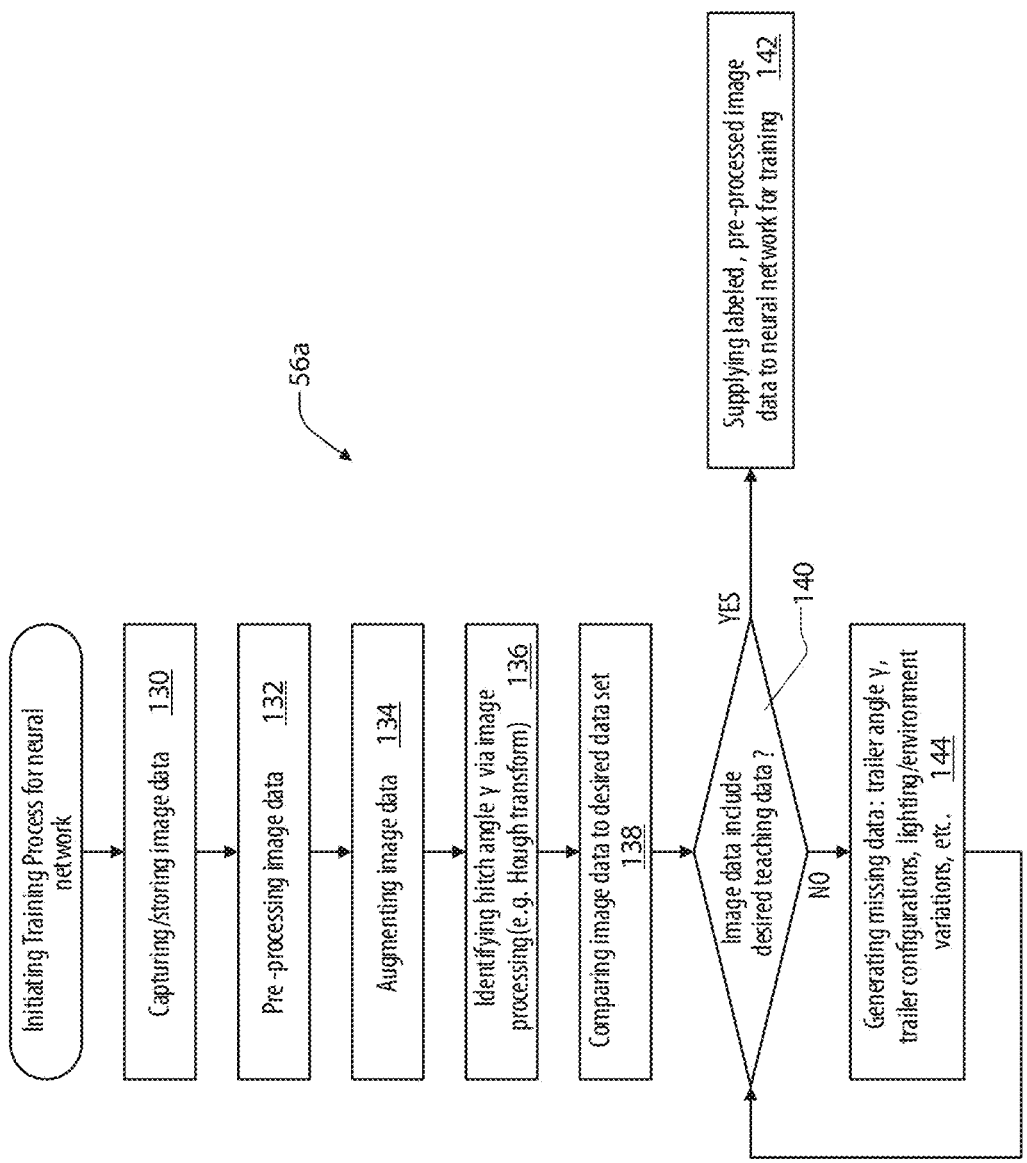
FIG. 6 is a flow chart of a training procedure for generating image data for training a neural network.

Referring now to FIG. 6, a flow chart of the training process 56a is shown providing further details the selection of the image data for training the neural network 102. The process 56a may begin by capturing image data with the imaging device demonstrating a field of view 48 including the coupler assembly 28 (130). Though discussed in reference to a single imaging device (e.g. the imaging device 14), the image data may be gathered by a number of imaging devices and reported to a central server via a wireless communication network and/or by accessing the image data stored in one or more memory devices incorporated in vehicles 12. In this way, the image data may be collected effectively to represent a variety of environments and operating conditions.

Once the image data is captured, the process 56a or method may continue by pre-processing the image data via the pre-processing module 104a (132). The pre-processing module 104a may be configured to crop each image frame captured by the imaging device 14. The cropping of the image data may be consistently processed based on the positional relationship of the hitch ball 30 in the field of view 48. For example, the hitch ball 30 may be registered or identified in the image data for each image set and corresponding hitch ball configuration 30 for the vehicle 12. Once identified, the controller 50 may be configured to crop the image data from the imaging device 14 based on predetermined extents or a portion of the image data designated in relation to the location of the hitch ball 30 in the field of view 48. In this way, the image data supplied to the neural network 102 may be limited in positional variation to improve the sample data provided to train the neural network 102.

Next, in step 134, the image augmentation module 104*b* may augment the image data by a variety of techniques (134). For example, the cropped image data received from the image pre-processing module 104*a* may be augmented by various techniques including, but not limited to, flipping, rotating, translating, scaling, color enhancing, histogram stretching, noise filtering, selective noise inclusion, etc. Following processing of the image data via the image pre-processing module 104*a* and/or the image augmentation module 104*b*, the controller 50 may further process the image data via one or more digital image processing or feature recognition techniques (e.g. Hough transform) to identify the trailer angle γ and label each frame of the image data via a trailer angle labeling module 104*c* (136). In this configuration, the trailer angle labeling module 104*c* may identify the trailer angle γ to be implemented as training data attributed to each of the frames of the image data that may be input into the neural network 102.

In step 138, the image processing apparatus 104 may be configured to compare the image set captured by the imaging device 14 with a variety of parameters that may be required for a complete set of teaching data. As previously discussed, the parameters for the image data may require a variety and distribution of trailer angles, trailer types, and/or environmental or lighting conditions. To address this requirement, the image processing apparatus 104 may select images representing each of a plurality values of the trailer angle γ. For example, the image processing apparatus 104 may select images including a range of angles specified for training (e.g. a range 100 deg. to +100 deg. from a centerline for the trailer angle γ). Additionally, the image processing apparatus 104 may select the images to include a precision of (for example 0.01 degree). Accordingly, the complete data set of images for training the neural network 102 may comprise 20,000 images to include the complete range of values for the trailer angle γ and at the desired resolution between the angles demonstrated.

In step 140, the process 56*a* may continue to identify whether each of image samples in the range of trailer angles γ is available in the image data. If each image in the desired range of angles is included image data, the method may continue to step 142 to supply the image data to the neural network 102 for training. Similarly, the image processing apparatus 104 may supply images or frames of the image data to the neural network 102 that comply with the requirements of the data set to complete the training process 56*a*. If the image data is incomplete as determined in step 140, the image processing apparatus 104 continues to generate the missing image data. For example, the image processing apparatus 104 may augment or adjust the image data with the image augmentation module 104*b* to adjust the appearance of the trailer to complete the image set by updating the trailer angle γ, changing the trailer type, and/or adjusting environmental or lighting conditions (144).

For example, in step 138, the image processing apparatus 104 may compare the image data to the desired data set to determine if the data set includes a depiction of the trailer 10 at a requested angle θ (e.g. θ=85.23 degrees). In step 140, the image processing apparatus 104 may identify that the requested angle θ is not included in the image data. In response to identifying that the image data does not include the requested angle θ, the image processing apparatus 104 may access one or more image frames that is close to the requested angle θ and adjust the appearance of the image frame to match the requested angle θ as further discussed in reference to FIG. 7.

Figure 7A:
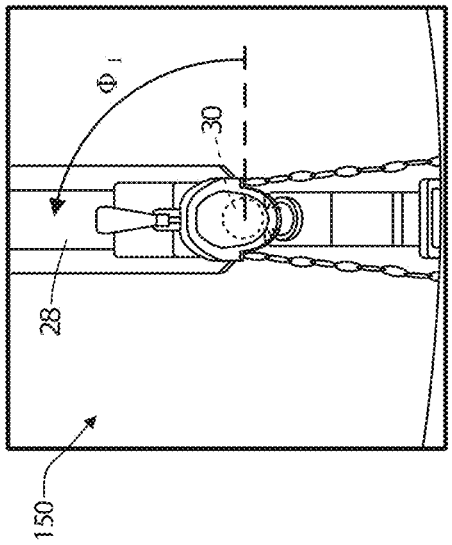
FIG. 7A is a projected view of a trailer in connection with a vehicle at a first angle.
Figure 7B:
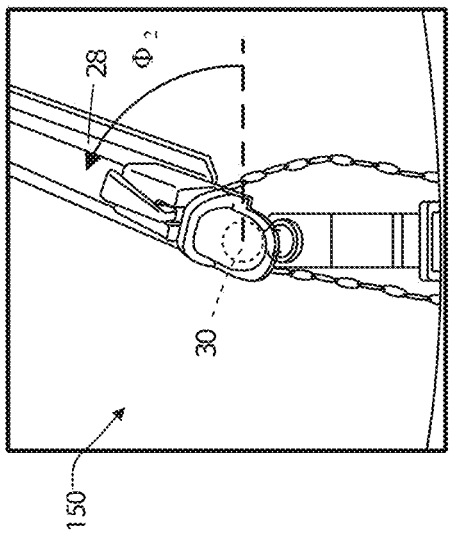
FIG. 7B is a projected view of a trailer in connection with a vehicle at a second angle.
Figure 7C:
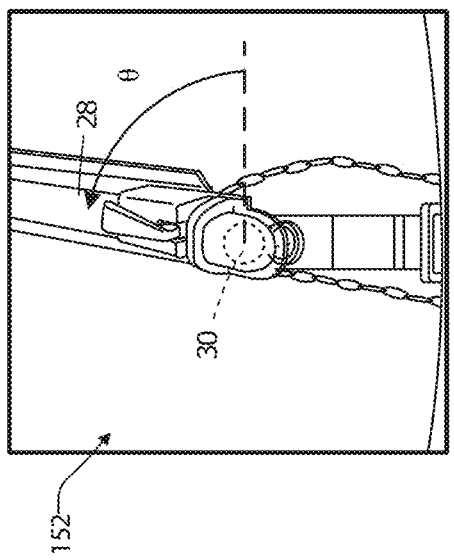
FIG. 7C is a projected view of a simulated or augmented trailer angle.

Referring now to FIGS. 7A, 7B, and 7C, a plurality of stored image frames 150 are shown. Continuing with the previous example, in response to the image processing apparatus 104 identifying that the requested angle θ (e.g. θ=85.23 degrees) is not included in the image data, as labeled by the trailer angle labeling module 104*c*, the image processing apparatus 104 may identify the stored image frames 150 that are closest to the requested angle θ. The image processing apparatus 104 may then compare the available angles $\phi_i$ of the stored image frames 150 to determine if the available angles $\phi_i$ are less than a predetermined angular change δ from the requested angle θ. (e.g. $|\theta-\phi_i|<\delta$). If the difference between the requested angle θ and the available angles $\phi_i$ (e.g. $\phi_1$ and $\phi_2$ as shown in FIGS. 7A and 7B) is less than the predetermined angular difference δ, the image processing apparatus 104 may rotate all or a portion of one of the stored images such that a new or augmented image 152 or frame is created. Once the augmented image 152 is created, the image processing apparatus 104 may supply the augmented image 152 to the neural network 102 for training. In this way, the image processing apparatus 104 may identify and generate the image data necessary to fulfill the angular range requirements necessary to accurately train the neural network 102.

Figure 8A:
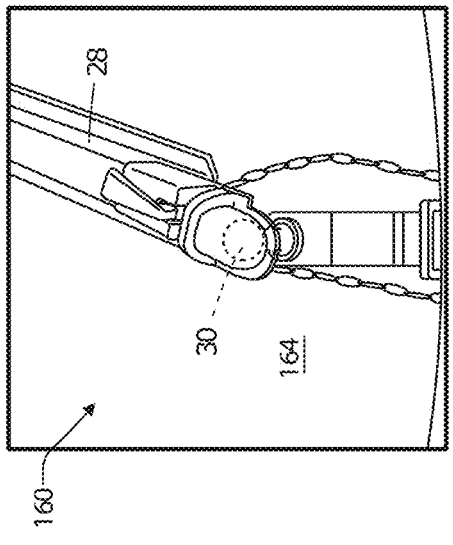
FIG. 8A is a projected view of a trailer in connection with a vehicle demonstrating a first lighting or environmental condition.
Figure 8B:
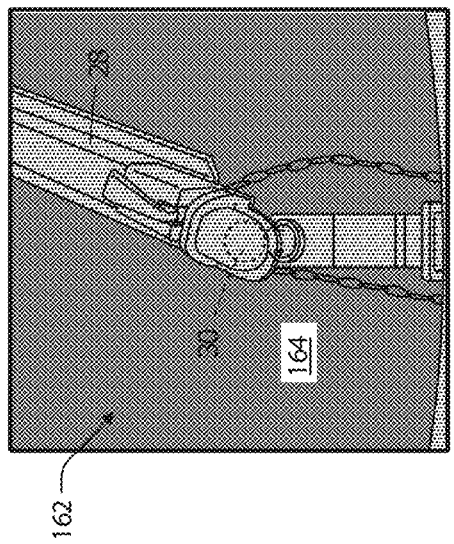
FIG. 8B is a projected view of a simulated or augmented image of the trailer demonstrating a second lighting or environmental condition in accordance with the disclosure.

Referring now to FIGS. 8A and 8B, the image processing apparatus 104 may similarly augment the image data to adjust the trailer type, the lighting, and/or the environment depicted in the image data. For example, a stored image 160 may be augmented by the image processing apparatus 104 to generate an augmented image 162. In this example, the augmented image 162 may be processed to adjust an appearance of a background 164 and the coupler assembly 28 depicted in the stored image 160. In this way, the image processing apparatus 104 may be configured to generate the augmented image 162 to supplement and complete the image data captured by the imaging device 14.

It is to be understood that variations and modifications can be made on the aforementioned structures and methods without departing from the concepts of the present invention, and further it is to be understood that such concepts are intended to be covered by the following claims unless these claims by their language expressly state otherwise.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

The invention claimed is:

1. A method for training an image-based trailer identification system comprising:
   capturing a plurality of captured images in a field of view;
   identifying a detected trailer angle for a trailer in connection with a vehicle in each of the captured images;
   comparing the captured images and the corresponding trailer angles to a predetermined image set comprising a plurality of teaching trailer angles;
   identifying at least one required trailer angle of the teaching trailer angles that is not included in the captured images;
   generating a simulated angle image based on the captured images, wherein the simulated image comprises a depiction of the trailer in connection with the vehicle at the at least one required angle not included in the captured images; and
   supplying the simulated angle image to the identification system for training.

2. The method according to claim 1, wherein the identifying of the detected trailer angle is determined by digitally processing the image data via a feature extraction technique.

3. The method according to claim 2, wherein the feature extraction technique comprises at least one of a line detection.

4. The method according to claim 1, wherein the identification system comprises a neural network.

5. The method according to claim 1, wherein the plurality of teaching trailer angles comprises a range of trailer angles for identification.

6. The method according to claim 5, wherein the plurality of teaching trailer angles comprises an increment between each trailer angle in the range of trailer angles.

7. The method according to claim 1, further comprising:
   detecting a lighting condition in the captured images and comparing the lighting condition to a required lighting condition for training the identification system.

8. The method according to claim 7, further comprising:
   in response to the lighting condition of the captured images differing from the required lighting condition, adjusting the lighting of at least one of the captured images to generate the simulated lighting image.

9. The method according to claim 8, further comprising:
   supplying the simulated lighting image to the identification system for training.

10. The method according to claim 1, wherein the image data is captured by a plurality of vehicles, each configured to capture the images in the field of view.

11. The method according to claim 10, further comprising:
   storing the captured images from the plurality of vehicles and compiling the captured images for comparing the captured images.

12. A system for training a neural network comprising:
    at least one imaging device configured to capture a plurality of captured images of a trailer in connection with a vehicle;
    an image processing apparatus configured to:
    identify a detected trailer angle from each of the captured images based on an image processing routine;
    compare the captured images and the corresponding detected trailer angles to a predetermined image set comprising a plurality of teaching trailer angles;
    identify at least one required trailer angle of the teaching trailer angles that is not included in the captured images;
    generate a simulated angle image based on the captured images; and
    supply the simulated angle image to the neural network for training.

13. The system according to claim 12, wherein the simulated angle image comprises a depiction of the trailer in connection with the vehicle at the at least one required angle not included in the captured images.

14. The system according to claim 12, wherein the image processing routine comprises a digital image processing technique comprising a feature extraction technique.

15. The system according to claim 14, wherein the feature extraction technique comprises at least one of a line detection.

16. The system according to claim 12, wherein the plurality of teaching trailer angles comprises a range of trailer angles for identification.

17. The system according to claim 16, wherein the plurality of teaching trailer angles comprises an increment between each trailer angle in the range of trailer angles.

18. The system according to claim 12, wherein the image processing apparatus is further configured to:
   detect a lighting condition in the captured images and compare the lighting condition to a required lighting condition for training the identification system.

19. The system according to claim 18, wherein the image processing apparatus is further configured to:
   in response to the lighting condition of the captured images differing from the required lighting condition, adjust the lighting to at least one of the captured images and generate the simulated lighting image.

20. A system for training a neural network comprising:
   at least one imaging device configured to capture a plurality of captured images of a trailer in connection with a coupler of a vehicle;
   an image processing apparatus configured to:
      identify a first trailer type in the captured images based on a feature extraction technique configured to identify at least one feature of the trailer relative to the coupler;
      compare the first trailer type to a plurality of teaching trailer types;
      generate a simulated trailer image comprising a second trailer type of the plurality of teaching trailer types that is not included in the captured images; and
      supply the simulated trailer image to the neural network for training.

* * * * *